(12) United States Patent
Taverner

(10) Patent No.: US 7,109,471 B2
(45) Date of Patent: Sep. 19, 2006

(54) OPTICAL WAVELENGTH DETERMINATION USING MULTIPLE MEASURABLE FEATURES

(75) Inventor: Domino Taverner, Delray Beach, FL (US)

(73) Assignee: Weatherford/Lamb, Inc., Houston, TX (US)

( * ) Notice: Subject to any disclaimer, the term of this patent is extended or adjusted under 35 U.S.C. 154(b) by 102 days.

(21) Appl. No.: 10/862,006

(22) Filed: Jun. 4, 2004

(65) Prior Publication Data

US 2005/0269489 A1   Dec. 8, 2005

(51) Int. Cl.
*G01J 1/04* (2006.01)
*G02B 6/00* (2006.01)

(52) U.S. Cl. .................. 250/227.14; 250/227.18; 385/13

(58) Field of Classification Search ........... 250/227.14–227.18; 385/12, 13, 15; 356/32, 356/35.1; 73/800
See application file for complete search history.

(56) References Cited

U.S. PATENT DOCUMENTS

| | | |
|---|---|---|
| 3,149,492 A | 9/1964 | Weinberg |
| 3,851,521 A | 12/1974 | Ottenstein |
| 4,080,837 A | 3/1978 | Alexander et al. |
| 4,114,439 A | 9/1978 | Fick |
| 4,144,768 A | 3/1979 | Andersson et al. |
| 4,159,646 A | 7/1979 | Paulsen et al. |
| 4,164,865 A | 8/1979 | Hall et al. |
| 4,236,406 A | 12/1980 | Reed et al. |
| 4,275,602 A | 6/1981 | Fujishiro et al. |
| 4,445,389 A | 5/1984 | Potzick et al. |
| 4,499,418 A | 2/1985 | Helms et al. |
| 4,515,473 A | 5/1985 | Mermelstein |
| 4,520,320 A | 5/1985 | Potzick et al. |
| 4,546,649 A | 10/1985 | Kantor |
| 4,706,501 A | 11/1987 | Atkinson et al. |
| 4,788,852 A | 12/1988 | Martin et al. |
| 4,813,270 A | 3/1989 | Baillie |
| 4,862,750 A | 9/1989 | Nice |
| 4,864,868 A | 9/1989 | Khalifa |
| 4,884,457 A | 12/1989 | Hatton |

(Continued)

FOREIGN PATENT DOCUMENTS

GB    2 346 965    8/2000

(Continued)

OTHER PUBLICATIONS

U.K. Search Report, Application No. GB0511295.8, dated Aug. 26, 2005.

(Continued)

*Primary Examiner*—Stephone B. Allen
(74) *Attorney, Agent, or Firm*—Patterson & Sheridan, LLP

(57) ABSTRACT

A method and apparatus for quickly and accurately determining optical wavelengths using multiple features of an optical spectrum produced by an optical element that is configured to produce an optical spectrum having multiple resolvable features. Finding the mean of the measured values of the multiple resolvable features may provide an improved characterizing measurement of the element. Examples of optical elements suitable for use in the present invention include, but are not limited to, super-structured fiber Bragg gratings, multiple fiber Bragg gratings, Fabry-Perot etalons and gas cells.

25 Claims, 7 Drawing Sheets

U.S. PATENT DOCUMENTS

| | | | |
|---|---|---|---|
| 4,896,540 A | 1/1990 | Shakkottai et al. | |
| 4,932,262 A | 6/1990 | Wlodarczyk | |
| 4,947,127 A | 8/1990 | Helms et al. | |
| 4,950,883 A | 8/1990 | Glenn | |
| 4,976,151 A | 12/1990 | Morishita | |
| 4,996,419 A | 2/1991 | Morey | |
| 5,024,099 A | 6/1991 | Lee | |
| 5,031,460 A | 7/1991 | Kanenobu et al. | |
| 5,040,415 A | 8/1991 | Barkhoudarian | |
| 5,051,922 A | 9/1991 | Toral | |
| 5,058,437 A | 10/1991 | Chaumont et al. | |
| 5,083,452 A | 1/1992 | Hope | |
| 5,099,697 A | 3/1992 | Agar | |
| 5,115,670 A | 5/1992 | Shen | |
| 5,152,181 A | 10/1992 | Lew | |
| 5,207,107 A | 5/1993 | Wolf et al. | |
| 5,218,197 A | 6/1993 | Carroll | |
| 5,317,576 A | 5/1994 | Leonberger et al. | |
| 5,321,991 A | 6/1994 | Kalotay | |
| 5,347,873 A | 9/1994 | Vander Hayden | |
| 5,361,130 A | 11/1994 | Kersey et al. | |
| 5,363,342 A | 11/1994 | Layton et al. | |
| 5,367,911 A | 11/1994 | Jewell et al. | |
| 5,372,046 A | 12/1994 | Kleven et al. | |
| 5,398,542 A | 3/1995 | Vasbinder | |
| 5,401,956 A | 3/1995 | Dunphy et al. | |
| 5,401,959 A | 3/1995 | Berkcan | |
| 5,426,297 A | 6/1995 | Dunphy et al. | |
| 5,440,932 A | 8/1995 | Wareham | |
| 5,493,390 A | 2/1996 | Varasi et al. | |
| 5,493,512 A | 2/1996 | Peube et al. | |
| 5,513,913 A | 5/1996 | Ball et al. | |
| 5,564,832 A | 10/1996 | Ball et al. | |
| 5,576,497 A | 11/1996 | Vignos et al. | |
| 5,591,922 A | 1/1997 | Segeral et al. | |
| 5,597,961 A | 1/1997 | Marrelli | |
| 5,639,667 A | 6/1997 | Heslot et al. | |
| 5,642,098 A | 6/1997 | Santa Maria et al. | |
| 5,644,093 A | 7/1997 | Wright et al. | |
| 5,654,551 A | 8/1997 | Watt et al. | |
| 5,657,405 A | 8/1997 | Fujiwara | |
| 5,670,720 A | 9/1997 | Clark et al. | |
| 5,680,489 A | 10/1997 | Kersey | |
| 5,689,540 A | 11/1997 | Stephenson et al. | |
| 5,708,211 A | 1/1998 | Jepson et al. | |
| 5,730,219 A | 3/1998 | Tubel et al. | |
| 5,732,776 A | 3/1998 | Tubel et al. | |
| 5,741,980 A | 4/1998 | Hill et al. | |
| 5,754,293 A | 5/1998 | Farhadiroushan | |
| 5,803,167 A | 9/1998 | Bussear et al. | |
| 5,804,713 A | 9/1998 | Kluth | |
| 5,808,779 A | 9/1998 | Weis | |
| 5,842,347 A | 12/1998 | Kinder | |
| 5,845,033 A | 12/1998 | Berthold et al. | |
| 5,906,238 A | 5/1999 | Carmody et al. | |
| 5,907,104 A | 5/1999 | Cage et al. | |
| 5,908,990 A | 6/1999 | Cummings | |
| 5,925,821 A | 7/1999 | Bousquet | |
| 5,925,879 A | 7/1999 | Hay | |
| 5,939,643 A | 8/1999 | Oertel et al. | |
| 5,956,132 A | 9/1999 | Donzier | |
| 5,959,547 A | 9/1999 | Tubel et al. | |
| 5,963,880 A | 10/1999 | Smith | |
| 5,975,204 A | 11/1999 | Tubel et al. | |
| 5,987,197 A | 11/1999 | Kersey | |
| 5,991,026 A | 11/1999 | Kluth et al. | |
| 5,992,519 A | 11/1999 | Ramakrishnan et al. | |
| 5,996,690 A | 12/1999 | Shaw et al. | |
| 6,002,985 A | 12/1999 | Stephenson | |
| 6,003,383 A | 12/1999 | Zielinska et al. | |
| 6,003,385 A | 12/1999 | De Vanssay et al. | |
| 6,009,216 A | 12/1999 | Pruett et al. | |
| 6,016,702 A | 1/2000 | Maron | |
| 6,158,288 A | 12/2000 | Smith | |
| 6,195,162 B1 | 2/2001 | Varnham et al. | |
| 6,212,306 B1 | 4/2001 | Cooper et al. | |
| 6,216,532 B1 | 4/2001 | Stephenson et al. | |
| 6,233,374 B1 | 5/2001 | Ogle et al. | |
| 6,279,660 B1 | 8/2001 | Hay | |
| 6,285,806 B1 | 9/2001 | Kersey et al. | |
| 6,337,737 B1 | 1/2002 | Chang et al. | |
| 6,346,702 B1 | 2/2002 | Davis et al. | |
| 6,354,147 B1 | 3/2002 | Gysling et al. | |
| 6,449,047 B1 * | 9/2002 | Bao et al. | 356/478 |
| 6,450,037 B1 | 9/2002 | McGuinn et al. | |
| 6,463,813 B1 | 10/2002 | Gysling | |
| 6,466,706 B1 | 10/2002 | Go et al. | |
| 6,489,606 B1 | 12/2002 | Kersey et al. | |
| 6,536,291 B1 | 3/2003 | Gysling et al. | |
| 6,601,458 B1 | 8/2003 | Gysling et al. | |
| 6,691,584 B1 | 2/2004 | Gysling et al. | |
| 6,782,150 B1 | 8/2004 | David et al. | |
| 2001/0013934 A1 | 8/2001 | Varnham et al. | |
| 2002/0129662 A1 | 9/2002 | Gysling et al. | |
| 2003/0066359 A1 | 4/2003 | Gysling et al. | |

FOREIGN PATENT DOCUMENTS

| | | |
|---|---|---|
| GB | 2 372 100 | 8/2002 |
| GB | 2 409 517 | 6/2005 |
| WO | WO 86/01286 | 2/1986 |
| WO | WO 98/36252 | 8/1998 |
| WO | WO 00/00793 | 6/2000 |
| WO | WO 00/00799 | 6/2000 |
| WO | WO 02/095329 | 11/2002 |

OTHER PUBLICATIONS

Leo L. Beranek and Istvan L. Ver, "Noise and Vibration Control Engineering, Principles and Applications", 1992, pp. 537-541.

A. P. Dowling and J. E. FFOWCS Williams, "Sound And Sources", 1983, pp. 224-229.

"Advances in Instrumentation and Control", Proceedings of the ISA 90 International Conference and Exhibit, New Orleans, Louisiana, Oct. 14-18, 1990, vol. 45, pp. 1889-1914.

Alan D. Kersey, Michel A. Davis, Heather, J. Patrick, Michael LeBlanc, K.P. Koo, *Member, IEEE*, C.G. Askins, M.A. Putnam, and E. Joseph Friebele, "Fiber Grating Sensors", *Journal of Lightwave Technology*, vol. 15, No. 8, Aug. 1997, pp. 1443-1463.

* cited by examiner

US 7,109,471 B2

OPTICAL WAVELENGTH DETERMINATION USING MULTIPLE MEASURABLE FEATURES

BACKGROUND OF THE INVENTION

1. Field of the Invention

This invention relates to determining optical wavelengths. More particularly, this invention relates to determining optical wavelengths using a plurality of resolvable features, such as spectral peaks and troughs, of a multi-component spectrum, such as those produced by multiple Bragg gratings or by a super-structured Bragg grating.

2. Description of the Related Art

Accurately determining the operational wavelength of an optical component such as a fiber Bragg grating (FBG) sensor is often very important. Some applications improve measurement accuracy by performing a statistical analysis (e.g. averaging) on a number of repeated optical measurements of the same device. This however increases the overall measurement time.

An FBG element is an optical element that is usually formed by photo-induced periodic modulation of the refractive index of an optical fiber's core. An FBG element is highly reflective to light having wavelengths within a narrow bandwidth that is centered at a wavelength that is referred to as the Bragg wavelength. Other wavelengths are passed through the FBG without reflection. The Bragg wavelength itself is dependent on physical parameters, such as temperature and strain, that impact on the refractive index. Therefore, FBG elements can be used as sensors to measure such parameters. After proper calibration, the Bragg wavelength is an absolute measure of the physical parameters. While the foregoing has described a single Bragg grating, multiple Bragg gratings or a super structured fiber Bragg grating can be formed at a particular position.

While FBG elements make useful sensors, it is very important to accurately measure the Bragg wavelength. Indeed, an accuracy and repeatability of less than 1 pm can be required.

Bragg wavelengths are found by sweeping light across a bandwidth that includes all of the possible Bragg wavelengths, and by measuring the power (intensity) of the reflected light over time. This is typically performed using optical sensors and optical couplers, a broadband light source, for example an edge-light-emitting diode (ELED) or a superfluorescent fiber source (SFS), and a tunable optical filter, for example a piezoelectric transducer (PZT) tunable fiber Fabry-Perot filter [Kersey, A. D., Berkoff, T. A., and Morey, W. W., "Multiplexed Fiber Bragg Grating Strain-Sensor System With A Fiber Fabry-Perot Wavelength Filter", Optics Letters, Vol. 18, pp. 1370–1372, 1993]. Alternatively, optical sensors and optical couplers can be used with a tunable laser source. For example an external cavity semiconductor laser with a tunable FBG reflector, reference, for example, U.S. Pat. No. 5,401,956, issued on Mar. 28, 1995.

A portion of the light from the optical source is coupled to an accurate wavelength reference element, such as a fixed Fabry-Perot wavelength filter, and the transmitted or reflected (as appropriate) light power is also measured over time. By comparing the measured power signal from the sensor elements against that received from the accurate wavelength reference accurate Bragg wavelengths of the FBGs sensors can be determined. Then, by noting the change in the Bragg wavelength from an unstressed condition a physical parameter of interest can be found, e.g., the temperature or pressure proximate the FBG can be determined. Many FBG elements can be located along one or more optical fibers providing multiple sensors to be demodulated by a single instrument.

The ultimate measurement resolution of such systems is limited by a variety of noise sources and by the received optical power from each element. Current measurement systems continue to push both the source and receiver design to their limits; high power lasers, low-noise, high sensitivity receivers, advanced signal processing. Yet one area that has received less attention is in the design of the optical element itself, through which, as shown by this invention, significant performance gains can be realized.

SUMMARY OF THE INVENTION

The principles of the present invention generally provide for quickly and accurately determining optical wavelengths using multiple features of an optical spectrum produced at a location by an optical element caoable of reflecting multiele wavelengths. Examples of such elements include, but are not limited to, multiple, co-located fiber Bragg gratings, a super structured fiber Bragg grating, and a Fabry-Perot etalon.

An optical wavelength measurement system that is in accord with the present invention includes a light source producing light that is swept over a bandwidth and an optical element. The optical element is comprised of multiple fiber Bragg gratings or of a super structured fiber Bragg grating. The optical element reflects that light when the light has a wavelength within a plurality of wavelength bands, wherein each wavelength band is characteristic of the optical element and wherein the reflections produce a plurality of resolvable features in intensity, amplitude or phase. Furthermore, a receiver produces signals from the reflected light, wherein the signals also include a plurality of resolvable features. A processor produces a reference characteristic of the optical element using the plurality of resolvable features of the signals. Because of the multiple resolvable features that reference characteristic can be more accurately known than when using any individual resolvable feature.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention provides for a method and apparatus for quickly and accurately determining optical wavelengths using multiple resolvable features such as spectral peaks or troughs in the optical spectrum produced by an optical element that interacts with light at multiple wavelengths. Such methods and apparatus are well suited for determining the Bragg wavelengths of FBG elements that produce multiple resolvable spectrum features. For example, FBG elements that incorporate multiple, possibly co-located, Bragg gratings or that incorporate super-structured Bragg grating elements can produce multiple resolvable features. Alternatively, instead of Bragg gratings, gas cells that produce multiple resolvable features can be used.

Figure 1:
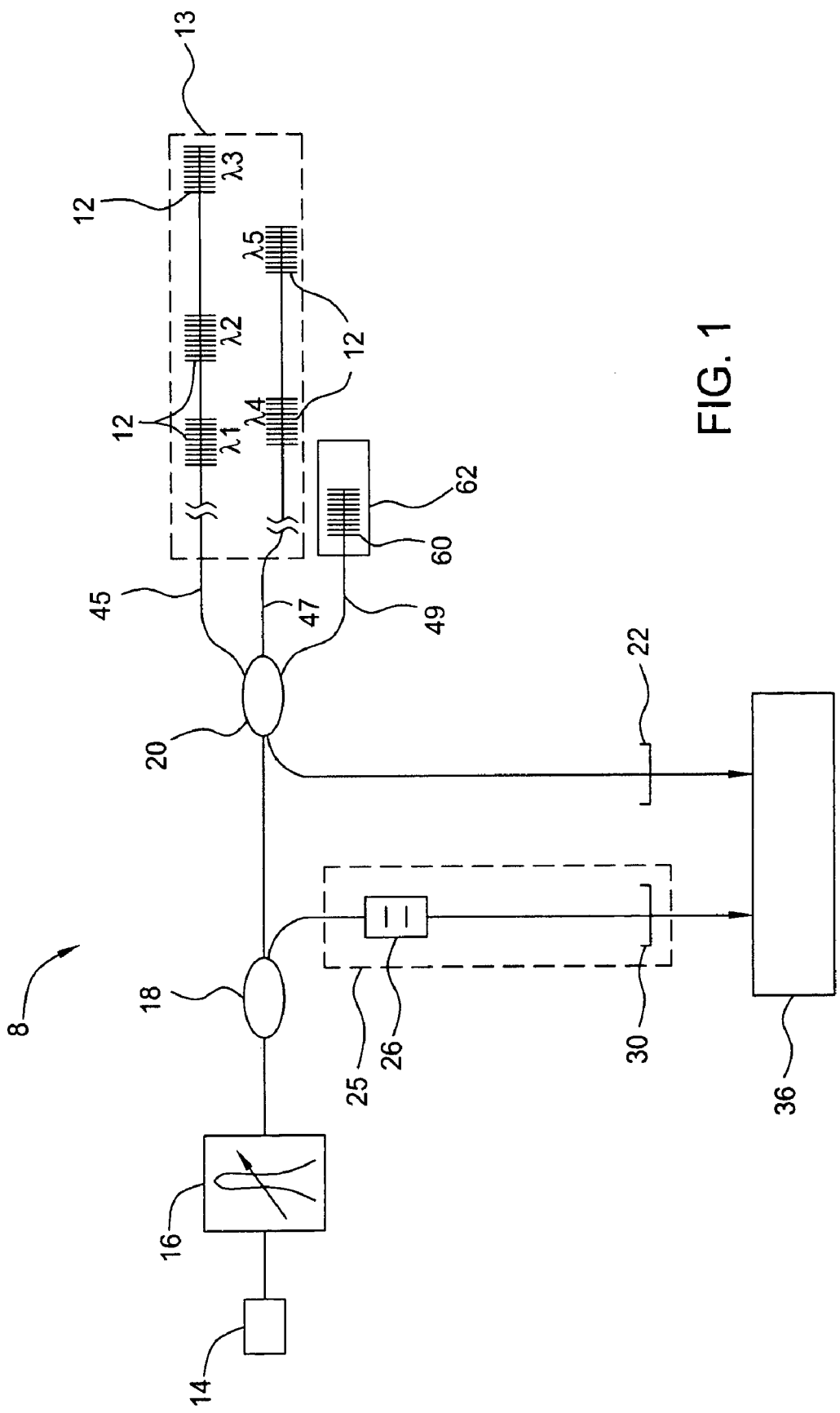
FIG. 1 depicts a wavelength measurement system for determining the Bragg wavelengths of a series of wavelength multiplexed fiber bragg grating (FBG) elements.

FIG. 1 illustrates an FBG sensor system 8 that is suitable for practicing the principles of the present invention. The FBG sensor system includes FBG elements 12 within an FBG sensor array 13. As shown, the FBG sensor array 13 may be comprised of one or more optical fibers 45 and 47, and the individual FBG elements 12 are each comprised of multiple, co-located, fiber Bragg gratings or superstructed Bragg gratings. The individual FBG elements interact with light at multiple wavelengths within wavelength bands $\lambda 1$ through $\lambda 5$. The wavelength measurement system 8 is suitable for measuring pressure and temperature in hostile environments such as occurs in oil wells.

Figure 2:
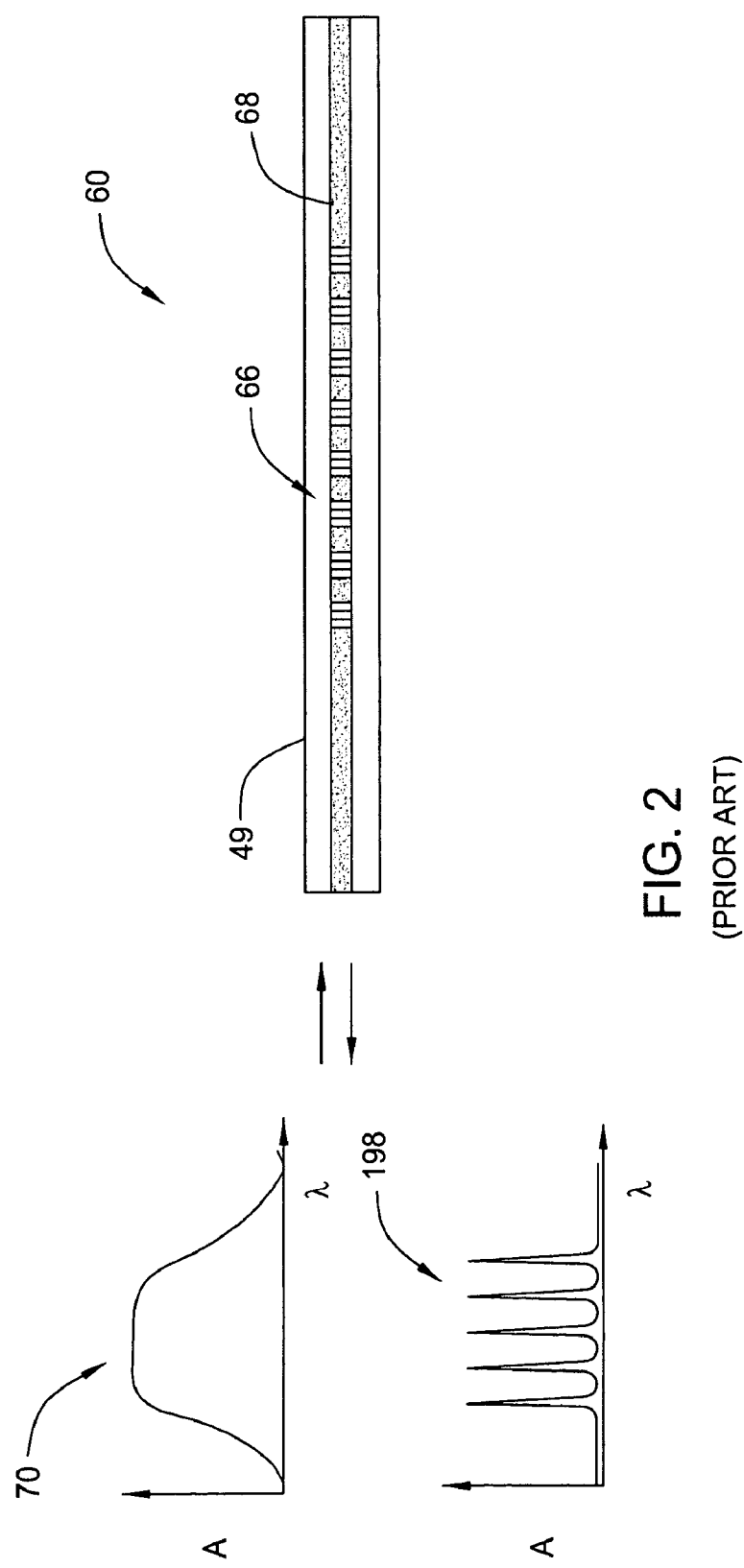
FIG. 2 illustrates an FBG element used in the measurement system of FIG. 1.

The wavelength measurement system 8 also includes an optical fiber 49 having a reference FBG element 60 that is physically and thermally protected by an enclosure 62. The reference FBG element 60 is a super-structured FBG element as depicted in FIG. 2. The reference FBG element 60 is comprised of gratings 66 that are induced in the core 68 of the optical fiber 49. When light having an input spectrum 70, plotted as amplitude verses wavelength, is applied to the reference FBG element 60 a multi-component output 198 is produced by reflections of light at multiple Bragg wavelengths. Alternatively, the multi-component output 198 could also be produced by multiple FBG elements, which might even be co-located. Since multiple FBG elements produce a multi-component output similar to output 198, the individual FBG elements 12 produce multi-component outputs.

Referring now to FIG. 1, the enclosure 62 protects the reference FBG element 60 such that its Bragg wavelengths are not susceptible to external influences. Alternatively, a thermometer could be used to determine the temperature of the reference FBG element 60. Then, based on the measured temperature the Bragg wavelengths of the FBG element 60 could be compensated for temperature. Either way, the reference FBG element 60 produces known multiple Bragg wavelengths that can be used to process signals from the FBG sensor array 13. Furthermore, the wavelength band of the multiple Bragg wavelengths of reference FBG element 60 differs from the wavelength bands $\lambda 1$ through $\lambda 5$.

The wavelength measurement system 8 further includes a broadband light source 14 that emits broadband light and a piezoelectrically tunable fiber F-P filter 16. The tunable fiber Perot-Perot filter 16 and the broadband light source 14 act together to produce narrow bandwidth light that is scanned across the Bragg wavelengths of the FBG elements 12 and of the reference FBG element 60.

The narrow bandwidth scanning light from the tunable fiber F-P filter 16 is split by a fiber optic directional coupler 18. The main portion of that light is coupled to the FBG sensor array 13 and to the reference FBG element 60 via a second directional coupler 20. Reflected light from the FBG sensor array 13 and from the FBG element 60, which occur when the wavelength of the narrow bandwidth scanning light sweeps across the Bragg wavelength of an FBG element 12 or of the reference FBG element 60, passes back into the directional coupler 20 and onto a sensor receiver 22. The sensor receiver 22 converts the Bragg wavelength reflections into sensor electrical signals having amplitudes that depend on the power (intensity) of the reflected light. Thus, the sensor receiver 22 acts as a power meter.

A portion of the light from the tunable fiber F-P filter 16 is directed by the fiber optic directional coupler 18 into a reference arm 25 having an interference filter 26, which is, for example, a fixed cavity F-P fiber filter. The interference filter 26 produces a reference spectrum having spectrum peaks with a constant, known frequency separation that depends on the interference filter 26. The reference spectrum is coupled to a reference receiver 30, which produces a reference electrical signal.

It is within the scope of the present invention to include an embodiment of the present invention wherein a broadband light source is used to produce the light signal and a receiver in optical communication with an optical element produces a received signal from the optical response, wherein the received signal includes a plurality of resolvable features. For example, such a broadband light source might be a superflourescent laser diode and such a receiver might be a Michelson interferometer based receiver.

The electrical signals from the sensor receiver 22 and from the reference receiver 30 are sequentially sampled, processed and compared in a signal processing and data presentation unit 36 to produce such measurements. That unit interrogates the sensor electrical pulse train to isolate the responses from the reference FBG element 60 (which are different than the wavelength bands $\lambda 1$ through $\lambda 5$). Those responses are then processed as is described below to produce a characteristic wavelength of the reference FBG element 60. That characteristic wavelength is then used to identify at least one reference peak, which together with the known reference peak spacing, are used as to determine the Bragg wavelengths in the wavelength bands $\lambda 1$ through $\lambda 5$.

Figure 3:
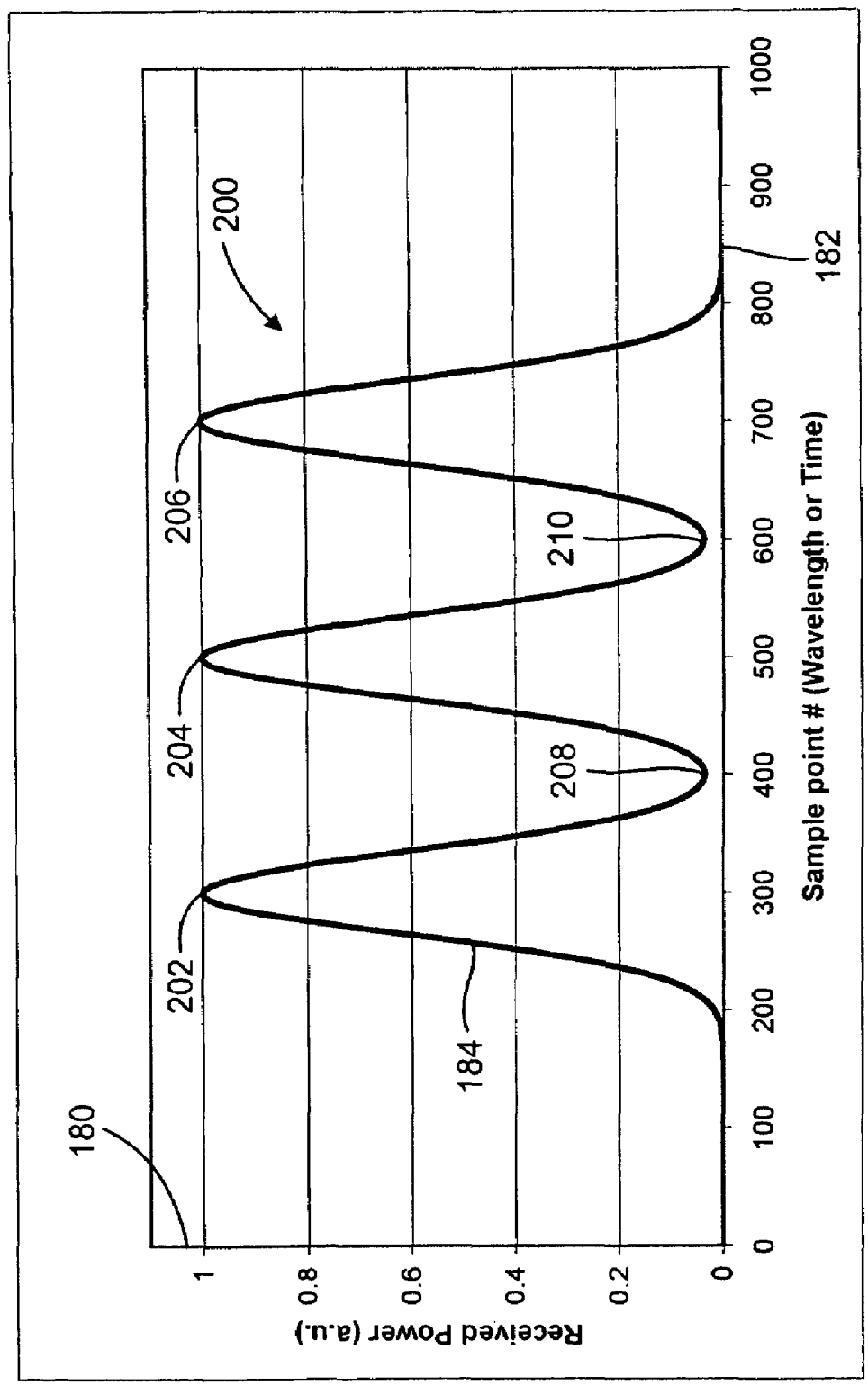
FIG. 3 depicts an ideal filter response from the FBG element depicted in FIG. 2.

A key to accurately determining Bragg wavelengths is accurately determining the position of each element 12, 60 in the measured signal sweep which can then be related to wavelength through use of the reference signal. FIG. 3 illustrates an ideal spectrum response 200 of the FBG elements 12, 60. The Y-axis 180 represents normalized power while the X-axis 182 represents time (and hence, wavelength). The graph 184 represents connecting ideal samples of wavelengths verses power. Each of the three peaks 202, 204, and 206 and each of the two troughs 208 and 210 represent resolvable features of the FBG elements 12, 60 that can be used to accurately determine a characteristic Bragg wavelength. The resolvable features 202–210, which are produced by the super-structure gratings 66 (see FIG. 2) can be used to determine a single parameter (e.g. time or wavelength) that characterizes the FBG elements 12, 60 to a greater accuracy than the measurement of just a single feature (a single peak or trough), e.g. by taking the mean of the wavelengths of the resolvable features. In practice, using the peaks 202–206 is usually better than using the troughs 208–210 as peaks provide better signal to noise ratio.

Figure 4:
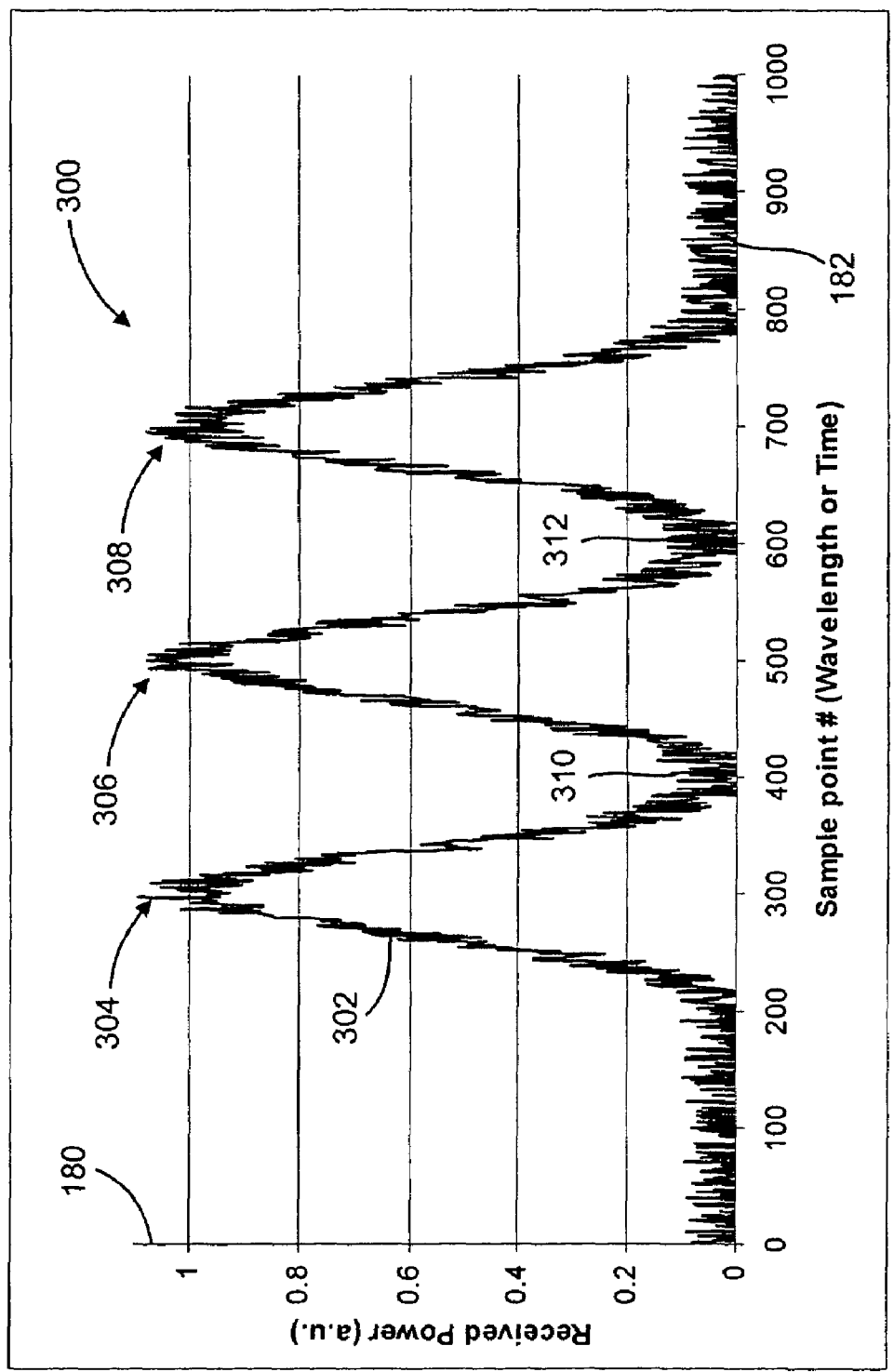
FIG. 4 depicts a noisy measurement of the filter response from the FBG element depicted in FIG. 2.
Figure 5:
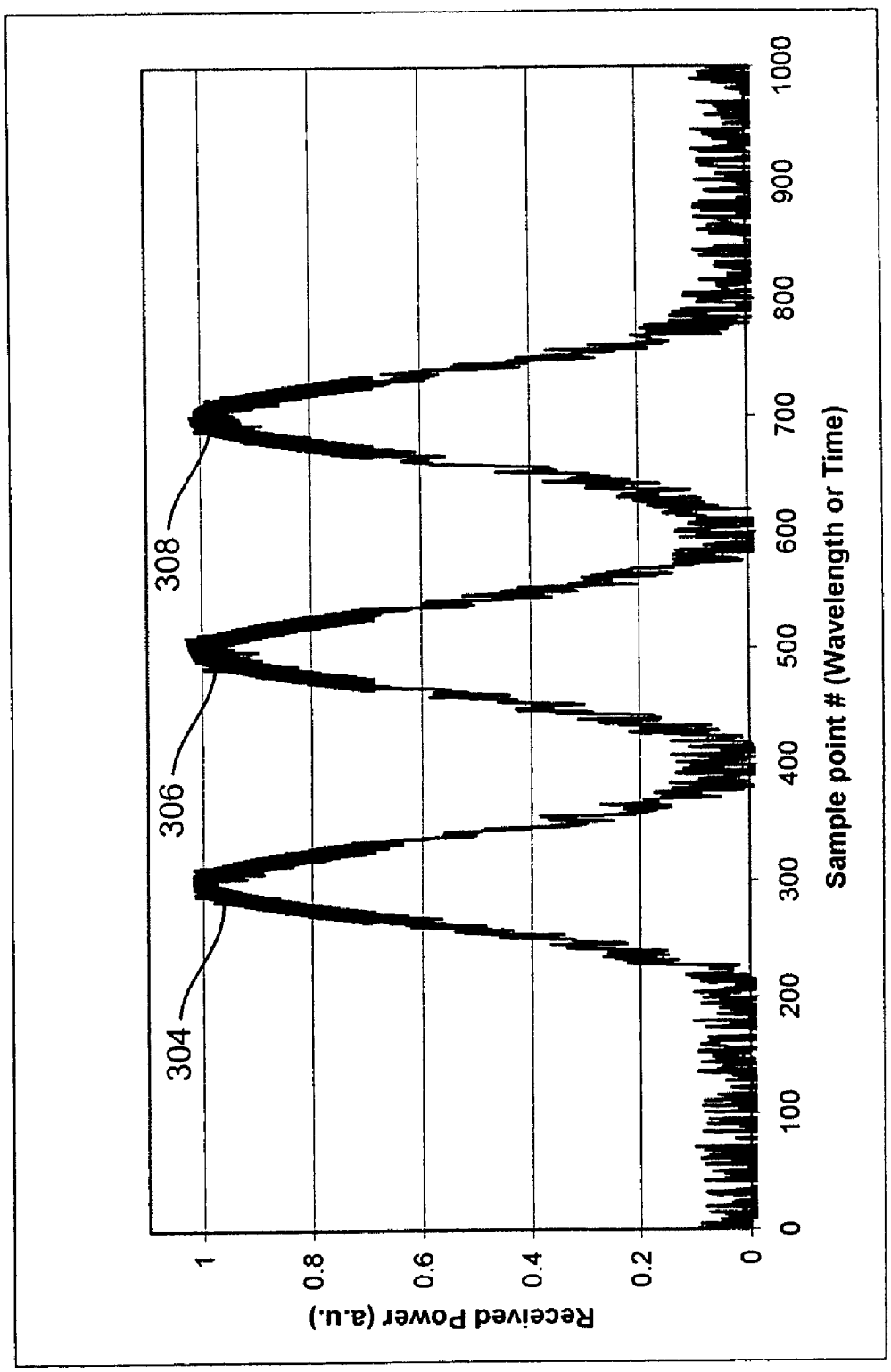
FIG. 5 depicts the fitting of a quadratic curve to the filter response of FIG. 4.

While FIG. 3 illustrates an ideal spectrum response 200 of the reference FBG elements 12, 60, FIG. 4 illustrates a more realistic measured spectrum response 300 in which the graph 302 of the samples is noisy. Such noise makes determining the absolute wavelength of any particular peak 304, 306, and 308, and any particular trough 310 and 312 uncertain because the noise will introduce error in any measurement.

Noise reduction techniques, such as low-pass filtering, may be applied at any point in the receiver chain and then the wavelength of each feature can be determined using an appropriate calculation. Examples of such calculations might be: curve fits to the feature, threshold crossing methods, local maxima or minima searches, and center of mass/centroid calculations.

After determining the position of each feature, the mean of the positions of the features, e.g. peaks 304, 306, and 308, is found. That mean is then used to characterize the FBG elements 12, 60. That characterizing mean can be more accurately known than any of the individual resolvable features. The signal processing and data presentation unit 36 uses the characterizing mean of the reference grating to identify a feature in the reference spectrum. Furthermore, since the reference spectrum peak spacing is known and is constant, the signal processing and data presentation unit 36 can then use the peaks in the reference spectrum to determine the Bragg wavelengths of the FBG elements 12 in the wavelength bands $\lambda 1$ through $\lambda 5$. Finally, once the deviations in the Bragg wavelengths from their calibrated wavelengths are known, one or more physical parameters of interest can be found, e.g., temperature or pressure proximate the FBG elements 12.

Figure 6:
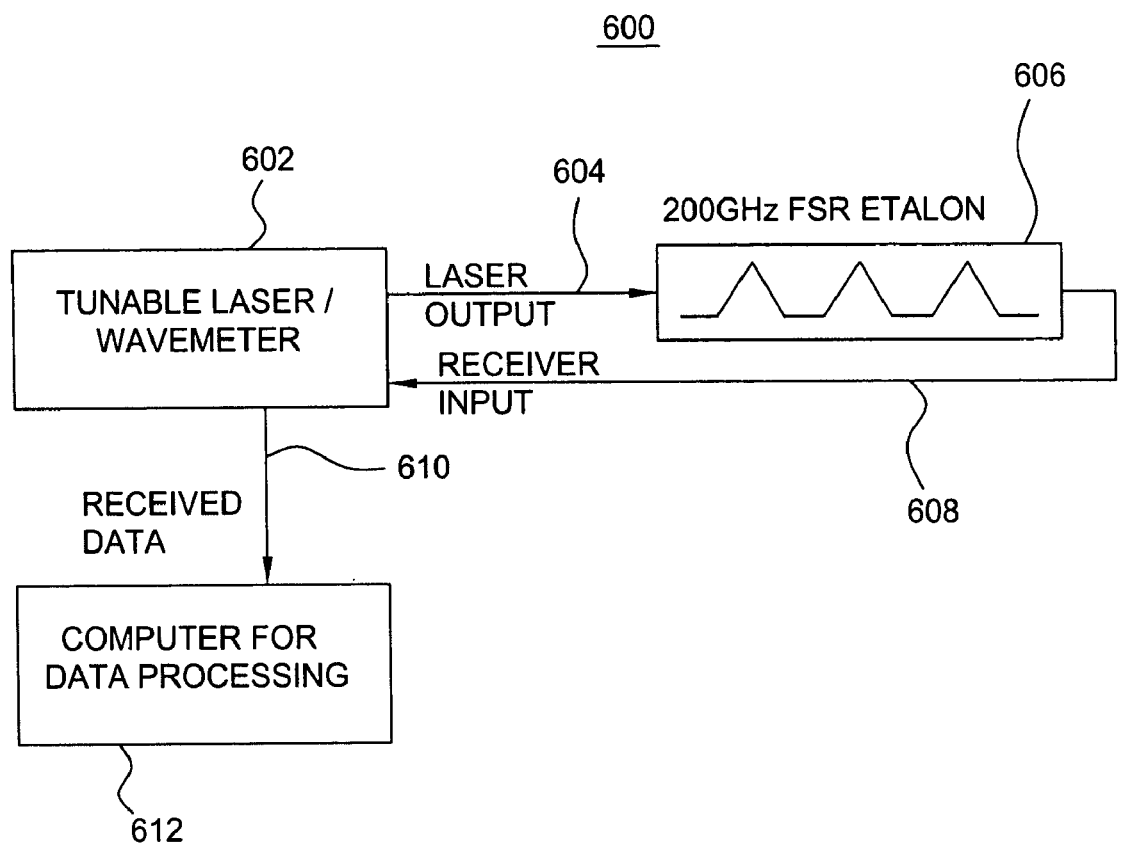
FIG. 6 illustrates a specific apparatus that demonstrates the principles of the present invention.

FIG. 6 illustrates a measurement system that can be used to test the principles of the present invention. The measurement system 600 includes a tunable laser wave-meter unit 602 (for example, Intune Altowave 5500) that outputs light 604 that interrogates a Fabry-Perot etalon 606. The etalon 608 has a free-spectral range of 200 GHZ, >13 dB extinction and approximately 180 pm full-width-at-half-maximum. The light 608 that passes through the etalon 606 is applied as a receiver input. The resulting electrical signals are sent as received data 610 to a computer 612 for processing. That processing includes peak wavelength determinations and subsequent averaging as previously described.

Figure 7:
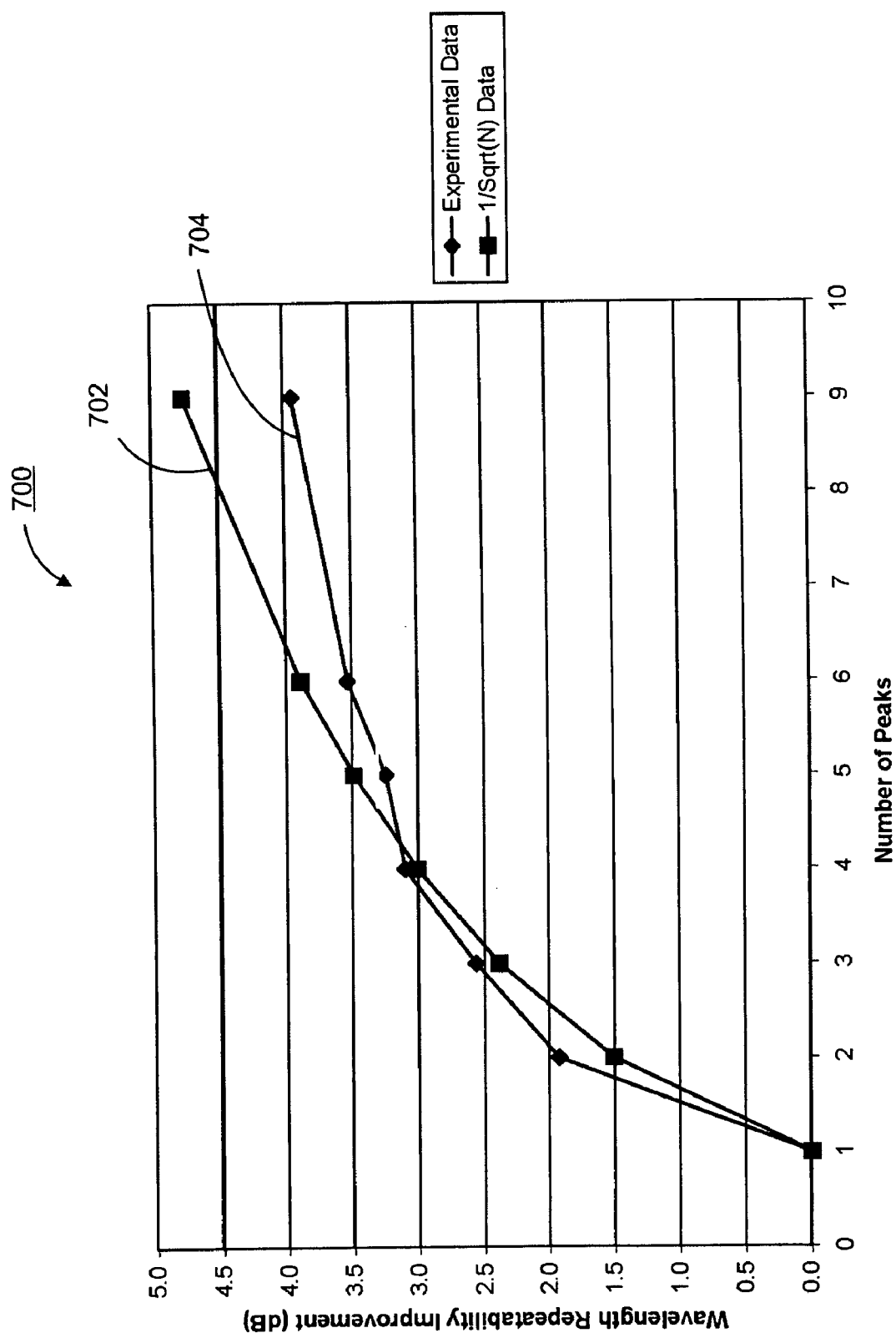
FIG. 7 illustrates the results of using an increasing number of peaks from the measurement of an etalon spectrum, using the apparatus of FIG. 6, to define an increasingly repeatable characteristic reference wavelength for the etalon.

The wavelength sweep range of the tunable laser wave-meter unit 602 can cover a large number of wavelength peaks of the etalon 606. For each bandwidth sweep of the light 604 the received data 610, which depends on wavelength verses signal intensity, can be obtained. Depending on the actual bandwidth sweep that is used, the received data can have a number of peaks. FIG. 7 is based on the relative improvement (reduction) in the Allan deviation as the number N of wavelength peaks (X-axis) used during signal averaging increases from one to nine. By taking the Allan deviation of the calculated wavelength over 200 sweeps, the statistical repeatability of the measurement was calculated. FIG. 7 shows wavelength repeatability improvement along the Y-axis. A plot of the measured improvement is shown as 704, while a plot of the predicted improvement, which depends on sqrt(N) is shown as graph 702. From FIG. 7 it is apparent that theory is in fairly good agreement with measured results.

Multiple resolvable features enable a large number of data points to be obtained in one measurement sequence. Taking the mean wavelength will typically reduce measurement uncertainty by a factor that depends on the square-root of the number of features. For example, a grating with nine resolvable peaks may produce a factor of three improvement in the uncertainty of a given measurement. Advantages of this invention over taking a number of separate measurements of a single feature include that only a single measurement is required, data processing to obtain the wavelengths of the multiple features takes significantly less time, and that further averaging over multiple optical measurements will continue to improve the measurement accuracy.

It should be understood that the principles of the present invention are applicable to many different types of optical elements that produces multiple wavelength references. For example, gas cells containing various gases, e.g. Acetylene, Hydrogen cyanide, Carbon dioxide, produce absolute wavelength reference absorption lines that can be compared to the grating and/or a reference etalon. While the foregoing is directed to the preferred embodiment of the present invention, other and further embodiments of the invention may be devised without departing from the basic scope thereof, and the scope thereof is determined by the claims that follow.

What is claimed is:

1. An optical wavelength measurement system, comprising:
   an optical source that produces optical radiation;
   an optical element having a plurality of reflective wavelength bands that produces an optical response signal from said optical radiation, wherein said optical response signal includes a plurality of resolvable features based on said plurality of reflective wavelength bands;
   a receiver in optical communication with said optical element producing a received signal from said optical response signal, wherein said received signal includes said plurality of resolvable features; and
   a processor for producing a reference characteristic of said optical element from said plurality of resolvable features.

2. A system according to claim 1, wherein said optical source sweeps over an optical spectrum.

3. A system according to claim 1, wherein said reference characteristic is determined by finding a mean of said resolvable features of said received signal.

4. A system according to claim 1, wherein said resolvable features of said received signal include intensity peaks.

5. A system according to claim 1, wherein the optical element is at least one of multiple, co-located fiber Bragg gratings, a super-structured fiber Bragg grating or a Fabry-Perot etalon.

6. A system according to claim 1, wherein said resolvable features of said received signal are filtered before said reference characteristic is determined.

7. A system according to claim 6, wherein said processor determines the wavelength of said resolvable features of said received signal by performing a fit of a quadratic curve.

8. A system according to claim 6, wherein said processor determines the wavelength of said resolvable features of said received signal by performing a mathematical process selected from a group consisting of:
   curve fitting to the feature, a threshold crossing method, a local maxima search, a local minima search, a center of mass calculation, and a centroid calculation.

9. A fiber Bragg grating (FBG) system, comprising:
   a light structure producing light that is swept over a bandwidth;
   a first optical coupler for coupling a first portion of said swept light onto a reference path and for coupling a second portion of said swept light onto a sensing path;

an interference filter in said reference path, said interference filter for producing a reference optical intensity spectrum comprised of evenly spaced optical signals;

a reference receiver taking light from said interference filter, said reference receiver for producing reference signals that correspond to said reference optical intensity spectrum;

a sensor receiver for producing sensor signals that correspond to an optical spectrum of an applied optical intensity;

a second optical coupler for coupling said second portion onto an optical fiber and for coupling light within said optical fiber to said sensor receiver as the applied optical intensity;

an FBG element in said optical fiber, said FBG element interacts with light in said second portion when said light has wavelengths within a plurality of wavelength bands, wherein each wavelength band is characteristic of said FBG element, and wherein said interactions yield a plurality of resolvable features based on said plurality of wavelength bands; and a signal processor coupled to said reference receiver and to said sensor receiver, said signal processor for producing a reference characteristic of said FBG element from said sensor signals and said reference signals.

10. A system according to claim 9, wherein said reference characteristic is determined by finding a mean of said sensor signals and a mean of said reference signals.

11. A system according to claim 9, wherein said processor filters said sensor signals and said reference signals before said reference characteristic is determined.

12. A system according to claim 9, wherein said processor determines the wavelength of said resolvable features of said signals by performing a mathematical process selected from a group consisting of curve fitting to the feature, a threshold crossing method, a local maxima search, a local minima search, a center of mass calculation, and a centroid calculation.

13. A system according to claim 9, wherein said resolvable features include optical peaks.

14. A system according to claim 9, further comprising an enclosure for protecting said FBG element.

15. A system according to claim 9, wherein said reference signals include a plurality of evenly spaced comb peaks.

16. A system according to claim 15, wherein said reference characteristic is used to identify at least one comb peak.

17. A system according to claim 9, wherein the light structure includes a broadband light source for emitting broadband light and a tunable optical filter for receiving said broadband light and for producing said swept light.

18. A system according to claim 17, wherein said tunable optical filter is a Fabry-Perot filter.

19. A system according to claim 9, further including an FBG sensor array coupled to said second optical coupler, wherein said FBG array includes an FBG sensor.

20. A system according to claim 19, wherein said FBG sensor array reflects or transmits light when said light has a wavelength characteristic of said FBG sensor, wherein said light is coupled to said sensor receiver, and wherein said processor determines a physical parameter based on the wavelength.

21. A system according to claim 9, wherein said reference path passes through a gas cell that produces absolute wavelength reference absorption lines.

22. A system according to claim 21 wherein said gas cell contains at least one gas from a group consisting of: acetylene, hydrogen cyanide, carbon dioxide, and combinations thereof.

23. A method of determining a fiber Bragg grating (FBG) wavelength comprising:

sweeping light across an FBG element that produces a spectrum having a plurality of resolvable features;

detecting the plurality of resolvable features; and determining the Bragg wavelength of the FBG element using the plurality of resolvable features based on a plurality of reflective wavelength bands.

24. A method according to claim 23 wherein the resolvable features include optical intensity peaks.

25. A method according to claim 23 further including filtering the resolvable features prior to determining the Bragg wavelength.

* * * * *